J. V. NELSON.
DRILLING ATTACHMENT FOR MILLING MACHINES.
APPLICATION FILED MAR. 26, 1920.
1,397,696.
Patented Nov. 22, 1921.
2 SHEETS—SHEET 1.
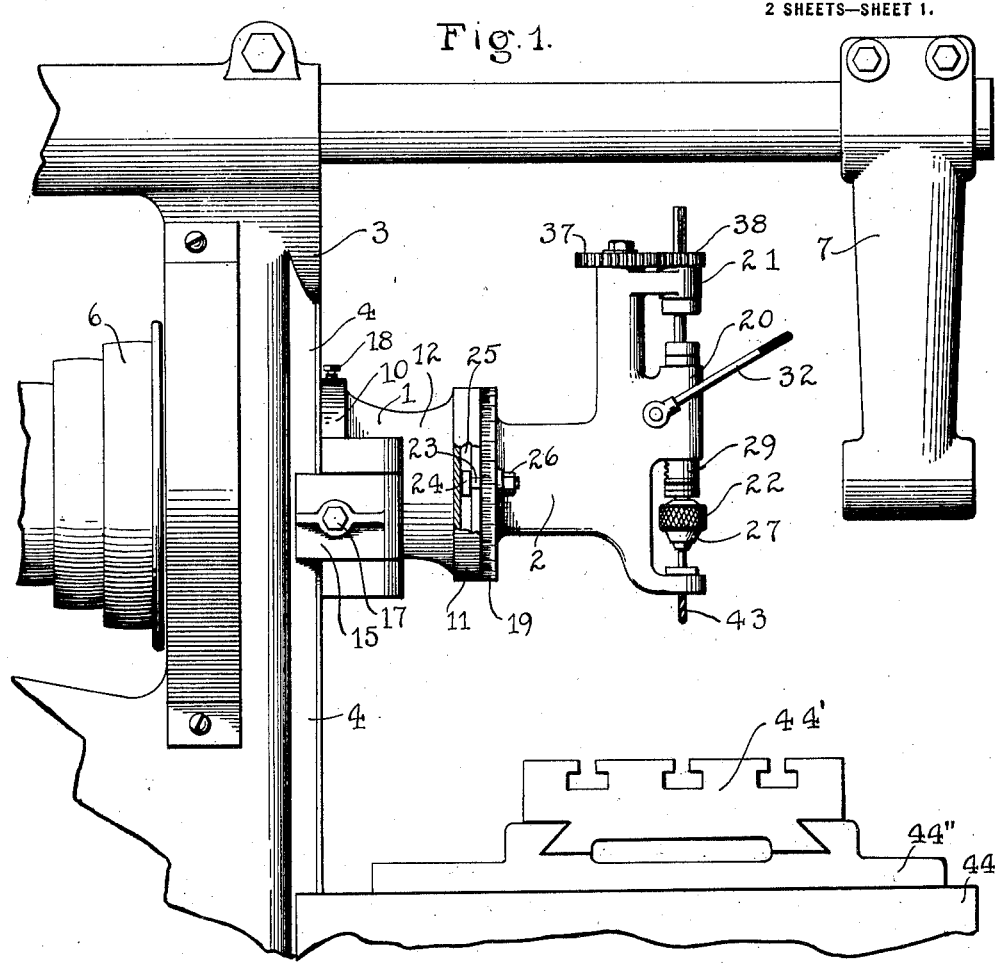
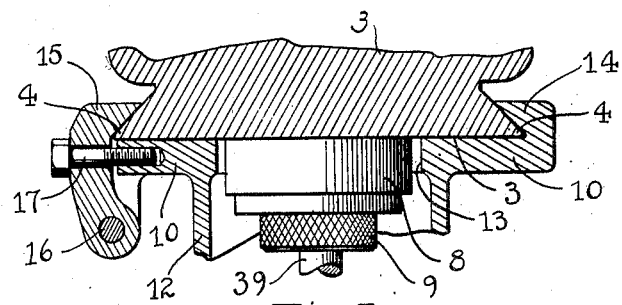
Witnesses:
Harold O. Van Antwerp
F. M. Davis
Inventor:
John V. Nelson
By Rummler & Rummler,
Attorneys.

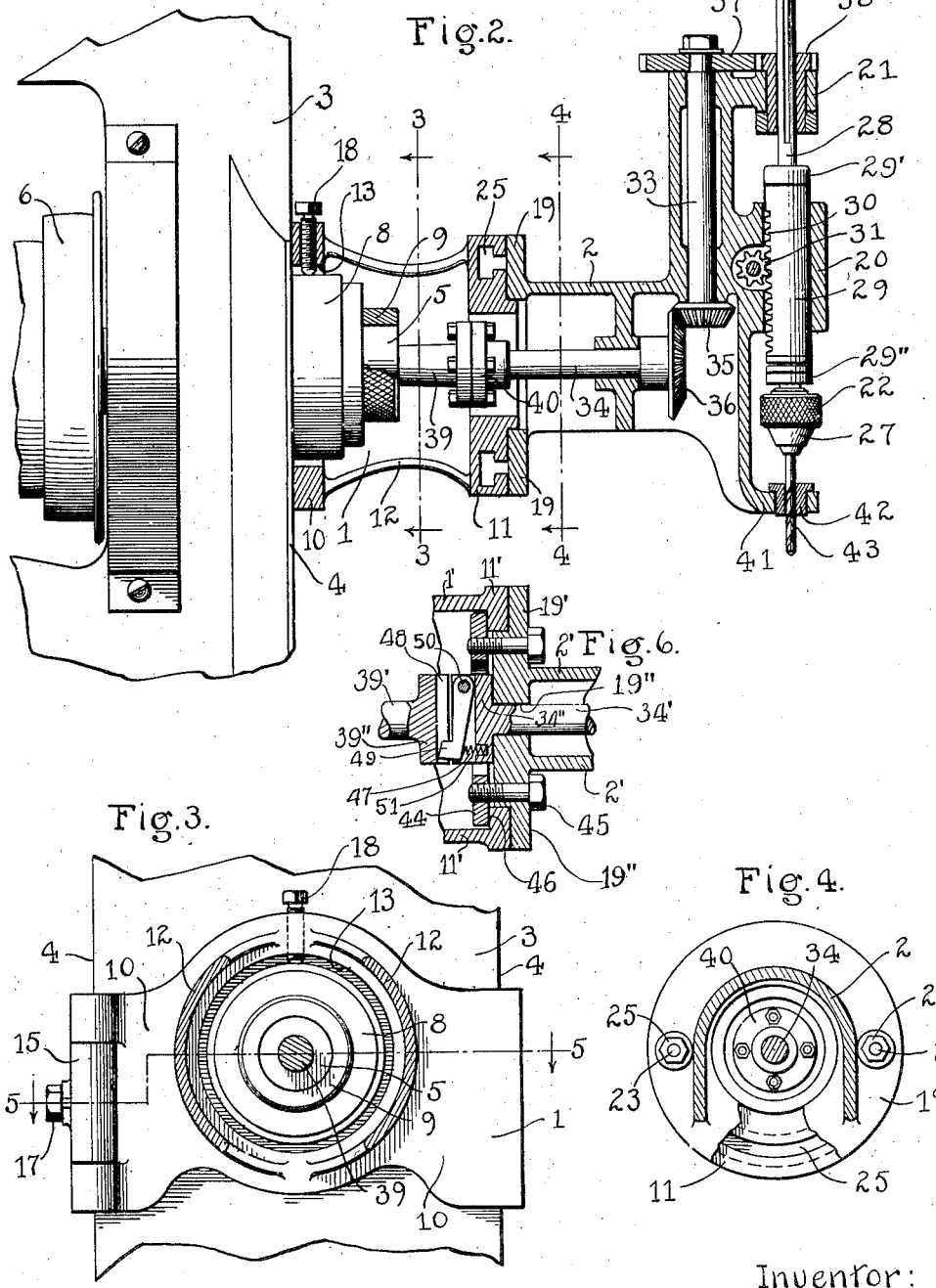

UNITED STATES PATENT OFFICE.

JOHN VICTOR NELSON, OF MAYWOOD, ILLINOIS, ASSIGNOR TO FRANZ K. KRAG, OF CHICAGO, ILLINOIS.

DRILLING ATTACHMENT FOR MILLING-MACHINES.

1,397,696.      Specification of Letters Patent.      Patented Nov. 22, 1921.

Application filed March 26, 1920. Serial No. 369,081.

*To all whom it may concern:*

Be it known that I, JOHN VICTOR NELSON, a citizen of the United States of America, and a resident of Maywood, county of Cook, and State of Illinois, have invented certain new and useful Improvements in Drilling Attachments for Milling-Machines, of which the following is a specification.

The main objects of this invention are to provide a spotting attachment for use on milling machines, whereby the necessary pilot drillings or "spots" on work to be drilled may be located and applied with greater convenience and accuracy than heretofore, and whereby the usual gages on the milling machine may be used in laying out the work clamped on the table of the milling machine, with the highest degree of accuracy; to provide in connection with such an attachment a positive guide for the pilot drill tip, so it cannot spring out of due alinement where it enters the work; to provide for an improved form of bracket, adapted for clamping the spotting attachment to the milling machine frame above the main table; to provide improved clamping means for securing said bracket in place on the table guideway; to provide on said bracket an improved head for supporting the tool holder and operating mechanism therefor; to provide an improved form of mounting for the head tiltably on said bracket whereby the tool may be adjusted for any desired angle; and to provide a device of this kind which is simple in construction and which may be quickly and easily placed in position upon the milling machine.

An illustrated embodiment of this invention is shown in the accompanying drawings, in which—

Figure 1 is a side elevation of the upper part of a milling machine, showing the spotting attachment arranged thereon.

Fig. 2 is an enlarged view of the attachment and adjacent head-stock and guideway, mainly in vertical section.

Fig. 3 is a transverse sectional detail on the line 3—3 of Fig. 2.

Fig. 4 is a transverse sectional detail on the line 4—4 of Fig. 2.

Fig. 5 is an enlarged fragmentary sectional detail taken on the line 5—5 of Fig. 3.

Fig. 6 is a sectional detail, similar to the middle part of Fig. 2, but showing a modified form of adjustable head connection and shaft coupling.

In the construction shown in the drawings, my improved attachment including the bracket 1, supporting the head 2, is secured detachably to the upper part of the main frame, concentric with the head-stock and spindle, substantially in place of the usual milling tool arbor.

The milling machine, as a whole, comprises mainly a vertical frame member 3, having guideways 4, at the opposite edge thereof, a driving element or spindle 5, rotated by a cone pulley 6, and as an adjustable arbor bearing 7. Such machines are also usually provided on the head stock with a bearing collar 8, arranged on the vertical frame part 3, concentrically with the chuck spindle 5, and a knurled ring 9.

In the specific embodiment of the spotting drill attachment shown in the drawings, the bracket 1, comprises a base part 10, and a flat annulus 11, supported in spaced relation by the arcuate-shaped web portions 12. The base part 10, has a circular opening 13, of somewhat larger diameter than the collar 8, and is provided with clamping jaws 14 and 15, which are constructed and arranged to be clamped upon the ways 4, for securing the bracket 1, in place on the vertical frame part 3. The jaw 14, is integral with the base part 10, and extends along one edge thereof. The jaw 15, is hingedly mounted on the base 10, by means of the pin 16, and is provided with a bolt 17, by which the jaw 15, may be urged toward the jaw 14, for clamping the bracket in place. An adjusting screw 18, is provided on the base part 10, and is adapted to bear against the collar 8, for the purpose of arranging the bracket in alinement with the axis of the spindle 5.

The head 2, is somewhat in the form of an L-shaped member having a flat annular part 19, by which the head is mounted upon the bracket 1, and bearings 20 and 21, which support the tool holder 22.

The head 2 is secured to the bracket 1, by bolts 23, the heads 24, of which are seated in T-shaped grooves 25, formed in the flat annular part 11, of the bracket 1. This enables the head to be turned to any angular position on the bracket 1, and be clamped in such position by tightening of the nuts 26.

The tool holder 22, may be of any suitable design comprising the usual chuck 27, carried by a shaft 28, which is rotatably mounted in a sleeve 29, axially shiftable in the bearing 20, through the action of the rack 30, and pinion 31, as controlled by the lever 32.

Relative movement of said shaft 28 and sleeve 29 lengthwise, is prevented by stop means, as for example, rings 29' and 29" fixed on shaft 28.

The driving mechanism for the tool holder comprises a pair of shafts 33 and 34, journaled in the head 2, at right angles to each other, the former being parallel to the axis of the shaft 28, and the latter being concentric with the axis of the abutting flat annular parts 11 and 19. The shafts 33 and 34 are connected together by 45° bevel gears 35 and 36, and the former is connected to rotate the shaft 28, by means of gears 37 and 38, the latter gear being splined to the shaft 28, as indicated in Figs. 1 and 2. An extension 39, is secured to the shaft 34, by a suitable coupling 40, which extension is of a taper construction and adapted to fit within the spindle or chuck 5, of the milling machine so as to have a driving connection therewith.

A downward guide member or extension 41, is formed on the head 2, and provided with an opening adapted to receive a sleeve or bushing 42, said bushing is in axial alinement with shaft 28 and chuck 27, and serves to hold the drill tip in axial alinement with the tool holder and so as to constitute a positive guide for the spotting drill 43, as it is moved toward and into the work; said guide being near the drill tip prevents its being sprung out of place.

Referring to the construction shown in Fig. 6, the bracket and head members are provided with simplified connecting means. In this instance, the annular end part 11' of the bracket 1', is secured to the abutting end part 19' of the head 2' by means of a flat washer-like annulus 44, having two or more threaded perforations to receive the clamping bolts 45, the heads of which bear against the outer face 19" of the part 19', and the part 11' being provided with an inwardly disposed flange or shoulder 46, against which said annulus is clamped by said bolts.

In order to adjust the angular position of the head 2' and spotting tool carried thereby, it is only necessary to loosen the bolts 45, swing the head 2' the required number of degrees as may be measured by the index and scale on the adjacent edges of the parts 11' and 19', whereupon the bolts 45, may be set to clamp the head rigidly in place.

In this instance, the shaft 34' and taper shank 39' are formed with mutually abutting heads 34" and 39", adapted to interlock automatically. For this purpose slots 47, and 48, are provided diametrically across the abutting ends. In one of the slots is mounted a dog 49, through one end of which extends a pivot 50 set in the head of shaft 34'. The opposite end of the dog is urged outward by a spring 51, for engagement with the opposite slot 48, when said slots are brought into parallel relation by relative turning of the shafts 34' and 39'.

Whenever it is desired to use a spotting attachment embodying my said invention, the milling arbor normally used in the machine is removed, and in place thereof the bracket 1 and parts carried thereby are clamped to the guideway 4, designed primarily for the vertical guidance and support of the table 44 on which the slotted workholding plate 44' is mounted, with a cross slide member 44" interposed. The taper shank of shaft 39' is then inserted in the driving spindle or chuck 5. The work to be spotted is then secured to the table member 44' or it may be that the work is already in place following some milling process thereon. The height of the table is then adjusted as usual in such machines to accommodate the range of the thrust of drill 43. The head 2 is normally set for vertical drilling, but in case of a curved, inclined or irregular surface to be spotted, the head may be tilted to whatever angle may be required.

Great precision in locating the "spots" may be attained by means of the usual adjusting means on such machines for moving the work-holding plate 44' both longitudinally and crosswise, the means for effecting such movement and the scales for measuring same being well understood by those skilled in the milling machine art though not here shown.

After the work has been spotted, it may be removed and placed in an ordinary drill press where the holes may be drilled immediately to their full size, the drill point readily centering in accordance with the depressions formed by the spotting drill 43.

Although but two specific embodiments of this invention are herein shown and described, it is to be understood that numerous details of the constructions shown may be altered or omitted without departing from the spirit of this invention as defined by the following claims.

I claim:

1. A tool holder for drills and the like, adapted for attachment to a milling machine, which attachment comprises a bracket, a pair of relatively adjustable jaws on said bracket constructed and arranged to clamp the vertical ways of said milling machine and to center the attachment horizontally, vertically acting threaded means for adjusting the height of said attachment on variously formed machines so as to secure said bracket in axial alinement with the spindle of the milling machine when said jaws are set, a head shiftably mounted on said bracket, a tool holder shiftably and rotatably mounted on said head at right angles to the axis of said spindle, and gearing adapted to connect said spindle with said tool holder.

2. A drilling attachment adapted for use on a milling machine, comprising a bracket, means for adjusting said bracket in axial alinement with the spindle of the milling machine, a pair of jaws on said bracket constructed and arranged to clamp the headstock ways of said milling machine, there being a flat annular part formed on said bracket, a head having a corresponding flat annular part adapted to abut against the flat annular part on said bracket, means for rotatably supporting the head on said bracket with said flat annular parts in abutting relation and adapted to clamp said head in any angular position, a tool holder rotatably and shiftably mounted on said head on an axis transverse to the axis of said flat annular parts, and gearing adapted to connect said tool holder with the spindle of said milling machine, said gearing including a shaft with a taper shank to fit the regular arbor chuck of the machine.

3. A spotting device, adapted for attachment to a milling machine, comprising a bracket, a pair of relatively adjustable jaws on said bracket constructed and arranged to clamp the ways of said milling machine, means to secure said bracket in axial alinement with the spindle of the milling machine, a flat annular part formed on said bracket, a head having a corresponding flat annular part adapted to abut against the flat annular part on said bracket, means for rotatably supporting said head on said bracket with said flat annular parts in abutting relation and adapted to clamp said head in any angular position, a tool holder rotatably and shiftably mounted on said head on an axis transverse to the axis of said flat annular parts, a pair of shafts journaled on said head at right angles to each other, one being parallel to the axis of said tool holder and the other being concentric with the axis about which said head is rotated on said bracket, gearing devices rotatably connecting said shafts with each other and said one shaft with said tool holder respectively, and a rotatable extension connected to said other shaft and adapted to be connected to the spindle of the milling machine.

4. A device of the character described comprising a bracket and a head supported thereby and joined endwise thereto in swivel relation, in combination with a pair of shafts also joined endwise, concentric within said bracket and head, and adapted to interlock automatically upon rotating one relative to the other, each having a transverse end slot with a spring actuated dog in one adapted to enter the slot of the opposite shaft when the slots are turned to the position of registry.

5. An attachment for milling machines, comprising a bracket adapted for detachable connection to the vertical table-guideway on the headstock in axial alinement with the regular milling taper chuck, said attachment including a jointed frame, one of the parts being swiveled adjustably to the other part on which it is supported and the first mentioned part having a radial manual thrust drill-chuck and spindle geared to the power source, said first mentioned part having a drill guide support in permanent alinement with said drill-chuck.

Signed at Chicago this 23 day of March, 1920.

JOHN VICTOR NELSON.